United States Patent [19]
Wiemers et al.

[11] Patent Number: 6,110,382
[45] Date of Patent: Aug. 29, 2000

[54] AUTOMATED EFFLUENCE CONDITIONING AND TREATMENT

[75] Inventors: Reginald A. Wiemers, Littleton, Colo.; Michael J. R. Costello, Hermosa Beach, Calif.; Alfred R. Simmons, Los Angeles, Calif.; Gerald L. Sealey, Torrance, Calif.

[73] Assignee: Ultra Fine, Inc., Denver, Colo.

[21] Appl. No.: 08/900,925

[22] Filed: Jul. 25, 1997

[51] Int. Cl.$^7$ ........................................ C02F 1/56
[52] U.S. Cl. .................. 210/709; 175/66; 210/725; 210/727; 210/740; 210/743
[58] Field of Search .................... 210/709, 724, 210/725, 739, 740, 743, 96.1, 143, 727; 175/66

[56] References Cited

U.S. PATENT DOCUMENTS

| | | | |
|---|---|---|---|
| 4,226,714 | 10/1980 | Furness et al. | 210/723 |
| 4,482,459 | 11/1984 | Shiver | 210/639 |
| 5,103,181 | 4/1992 | Gaisford et al. | 324/637 |
| 5,145,256 | 9/1992 | Wiemers et al. | 366/336 |
| 5,171,090 | 12/1992 | Wiemers | 366/165 |
| 5,902,487 | 5/1999 | Pickering et al. | 210/709 |

Primary Examiner—Peter A. Hruskoci
Attorney, Agent, or Firm—Harold A. Burdick

[57] ABSTRACT

Automated process, conditioning and treatment apparatus and methods are disclosed that are particularly well adapted for closed loop systems using or producing aqueous effluence with varying amounts of suspended solids therein, the apparatus and methods directed to separation of the solids from the effluence and thus cleaning of the centrate. The apparatus includes a mass flow rate meter, liquid polymer injector and control means for receiving the monitored rate from the meter and performing analysis to optimize the rate of injection of liquid polymer. The injector is monitored to further optimize the injection rate.

13 Claims, 5 Drawing Sheets

AUTOMATED EFFLUENCE CONDITIONING AND TREATMENT

FIELD OF THE INVENTION

This invention relates to apparatus and methods for treating and/or conditioning effluence containing suspended solids in liquid, and, more particularly, relates to apparatus and methods for treating and conditioning drilling fluid or mud.

BACKGROUND OF THE INVENTION

The handling of effluents issuing from various mining, manufacturing and/or municipal facilities continues to be of concern. Cleaning and recycling of aqueous based effluence is handled in a variety of ways. For example, in well drilling or other mining operations, the outflow from the drilling process is commonly directed to shallow settling ponds. This approach has resulted in unsightly and potentially hazardous environmental conditions near such well sights, and increases the cost of such operations (e.g., by requiring greater water or process solids costs due to single use cycles).

In response to such concerns, closed loop drilling systems are used which process the outflow on site using polymer flocculants and other chemical substances. Constant monitoring of these operations, in addition to personnel for operating the systems, is required however, thus adding to the costs associated with extraction. Close attention to monitoring is required (and thus skilled system attendants) to assure proper dosages of polymer flocculant to avoid incomplete removal of solids (under dosage) or the waste, expense and potential for solids restablization effect (and return to active drilling fluids jeopardizing mud chemistry and the drilling operation and tools themselves) inherent in over dosage.

While composition monitors, as well as closed loop drilling fluid processing apparatus, are known (see, for example, U.S. Pat. Nos. 5,103,181, 5,145,256 and 5,171,090), further improvement could thus be utilized.

SUMMARY OF THE INVENTION

This invention provides apparatus and methods for automated effluence conditioning and treatment. The apparatus is particularly well adapted for processing drilling fluids (mud), for example in closed loop (pitless) drilling systems, to facilitate recovery and recycling of water in the effluence (for reuse in the system) and the suspended solids therein (for storage, transport, disposal or resale). The automation of process monitoring and effluence conditioning and treatment provides reliable on-site effluence processing at little added labor cost.

The apparatus includes a conduit for conducting flow of the effluence and a sensing mechanism at the conduit providing an output indicative of mass flow rate of the drilling fluid conducted through the conduit. An injection pump injects polymer material into the flow of drilling fluid under the control of a microprocessor or other controller connected with the sensing mechanism and the pump. The rate of injection is calculated at the controlled to provide a preselected polymer conditioning of the fluid output from the apparatus at the sensed mass flow rate.

The rate of polymer injection is self adjustable by provision of a second sensing mechanism downstream of the injection pump providing an output indicative of injection rate of the liquid polymer by the injection pump. The controller is connected to receive this output and, responsive thereto, provide a control signal to the injection pump to adjust pumping rate and thereby rate of injection of the liquid polymer into the conduit based on mass flow rate of the suspended solids in the effluence flowing through the conduit and actual injection rate of the pump.

The method of this invention includes the steps of conducting a flow of an aqueous effluence having solids suspended therein, monitoring the conducted flow and indicating mass flow rate of the conducted flow of the aqueous effluence, and determining likely mass flow rate of the suspended solids in the conducted flow from the indicated mass flow rate of the conducted flow of the aqueous effluence. A control signal indicative of a desired rate of liquid polymer injection into the conducted flow based at least in part on the determined likely mass flow rate of the suspended solids is generated and utilized to drive a mechanism for injecting liquid polymer into the conducted flow at the desired injection rate.

Further conditioning and treatment apparatus and method steps are provided by this invention to control and optimize pH of the effluence, effluence conditioning rate and weight control, and coagulant insertion into the flow of the effluence.

It is therefore an object of this invention to provide apparatus and methods for automated process monitoring, conditioning and treatment of effluence such as drilling fluids.

It is another object of this invention to provide automated injection control and on the fly adjustment for injecting polymer material at selected treatment rates into an aqueous effluence having varying amounts of suspended solids therein.

It is still another object of this invention to provide automated process control and drilling fluid conditioning apparatus and methods for closed loop drilling operations.

It is still another object of this invention to provide reliable, low cost apparatus and methods for automated process monitoring, conditioning and treatment of effluence to facilitate recovery and recycling of water in the effluence (for reuse in the system) and suspended solids therein (for storage, transport, disposal or resale).

It is yet another object of this invention to provide an apparatus for automated treatment of drilling fluid with polymer material to provide a preselected polymer conditioning of the fluid output from the apparatus, the apparatus including a conduit for conducting flow of the drilling fluid, sensing means at the conduit providing an output indicative of mass flow rate of the drilling fluid conducted through the conduit, injecting means at the conduit including a pump for injecting the polymer material into the flow of drilling fluid, and control means connected with the sensing means and the pump of the injecting means for receiving the output from the sensing means and, responsive thereto, operating the pump to cause injection of an amount of the polymer material into the flow of drilling fluid calculated at the control means to provide the preselected polymer conditioning of the fluid output from the apparatus.

It is yet another object of this invention to provide a self adjusting apparatus for automated liquid polymer conditioning of an aqueous effluence having varying amounts of suspended solids therein to prepare the effluence for treatment to remove the solids, the apparatus including a conduit for conducting a flow of the aqueous effluence, a supply line connected with the conduit for conducting a flow of the liquid polymer, first sensing means at the conduit providing an output indicative of flow rate of the aqueous effluence and density of the aqueous effluent, a controllable injection pump connected at the supply line, second sensing means downstream of the controllable injection pump providing an output indicative of injection rate of the liquid polymer from the supply line into the conduit by the controllable injection pump, and control means connected with the first and second sensing means and the controllable injection pump for receiving the outputs from the first and second sensing means and, responsive thereto, providing a control signal output to the controllable injection pump to adjust pumping rate and thereby rate of injection of the liquid poly per into the conduit based on mass flow rate of the suspended solids in the aqueous effluent flowing through the conduit and sensed injection rate of the injection pump.

It is still another object of this invention to provide a method for liquid polymer conditioning of an aqueous effluent having varying amounts of suspended solids therein to prepare the effluent for treatment to remove the solids including the steps of conducting a flow of the aqueous effluent, monitoring the conducted flow and indicating mass flow rate of the conducted flow of the aqueous effluent, determining likely mass flow rate of the suspended solids in the conducted flow from the indicated mass flow rate of the conducted flow of the aqueous effluent, generating a control signal indicative of a desired rate of liquid polymer injection into the conducted flow based at least in part on the determined likely mass flow rate of the suspended solids, and utilizing the generated control signal to drive a mechanism for injecting liquid polymer into the conducted flow at the desired injection rate.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
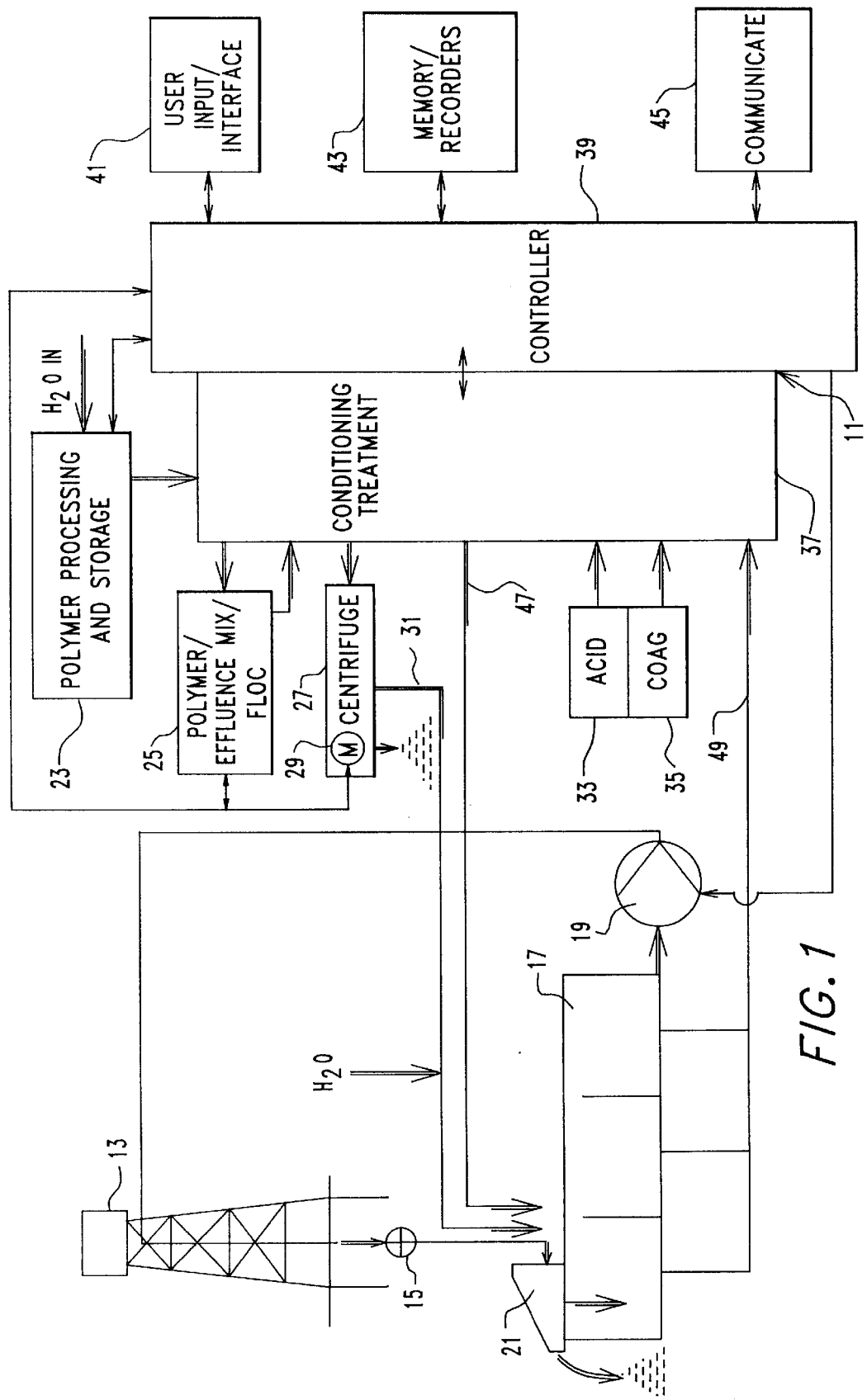
FIG. 1 is a block diagram showing the apparatus of this invention in an effluent treating system.

Conditioning, treatment and process control apparatus 11 of this invention is shown for use in conjunction with a closed loop drilling system in FIG. 1, the apparatus for drilling fluid, or mud chemistry process control and achieving a selected drilling mud conditioning to enhance the removal and recovery of suspended solids therein (referring to the drawings, as this description proceeds fluid conduits will be indicated by dual lining and information and signal lines from and to apparatus 11 will be indicated by single lining). The closed loop system includes drilling rig 13 at well 15, and drilling mud formation and storage tank system 17 having an outlet to pump 19 for moving the drilling mud to the well in the drilling process.

Effluence returning from the well is first processed at shaker 21 to remove the heavier solids from the outflow and is then removed to mud tank system 17 for reuse. Also included in the closed loop system is a polymer processing and storage unit 23 providing liquid polymer flocculant for use with the apparatus of this invention (for example, including a mixer for preparing liquid polymer from dry polymer), mixing unit 25 for processing the liquid flocculant into the drilling fluid, and centrifuge 27, including motor 29, for removal of the floc and solids from the effluent and providing clean centrate (water) outlet 31 for use in mud makeup at tank system 17. Acid and coagulant storage units 33 and 35 provide various system chemicals known to such processes for use at apparatus 11.

Apparatus 11 includes electro-mechanical monitoring, conditioning and treatment units 37 and process controller 39 (for example a CHESSELL MULTIPOINT recorder and processor by Eurotherm Recorders, Inc., or other microprocessor, personal computer or the like, though plural processors and/or various analogue controllers could also be utilized). User input interface unit or units 41 (for example a key board and monitor), storage memory (disk, tape, or internal) and recorder (strip recorders, printers or the like) unit or units 43, and communication interface 45 (modem, transmitter/receiver units or the like) are also provided. Bypass return conduit 47 to tank system 17 carries drilling mud back to the tank system under some circumstances as hereinafter described.

Pump 19, units 23, 25, 27, 41, 43 and 45 are all connected with controller 39 and are preferably directly monitored and controlled thereat.

Figure 2:
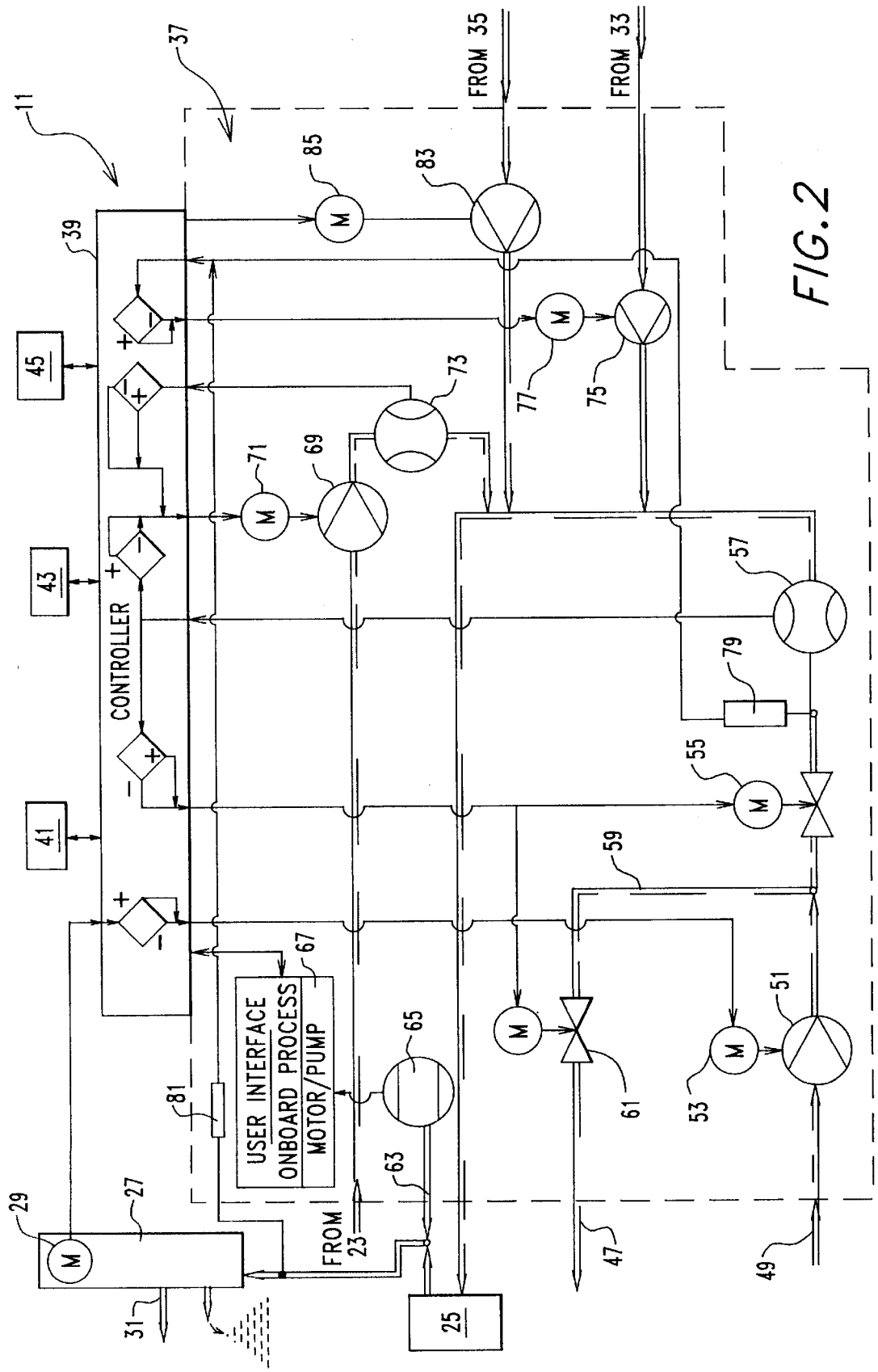
FIG. 2 is a detailed block diagram of the apparatus of this invention.

Turning now to FIG. 2, monitoring, conditioning and treatment units 37 include several process and effluent conditioning and treatment stages operated and controlled by controller 39. Drilling fluid from tank system 17 is directed through conduit 49 by variable speed feed pump 51, the operational speed (i.e., pumping rate) of which is controlled by motor 53. Fluid passes to motor controlled variable aperture valve 55 and, unless valve 55 is completely closed, through mass flow rate meter or meter grouping 57. Some or all of the drilling fluid flow may be directed by valve 55 through conduit 59 and motor controlled variable aperture valve 61 to conduit 47 for return to mud tank system 17. Such two valve control is preferred for control of mud weight in the system as hereinafter detailed.

Meter 57 may be a single instrument, such as a Coriolus meter (which is preferred, for example a MODEL CMF 300 mass flow and density sensor by MICROMOTION, INC.), or separate instruments, such as a flow meter and a densitometer. In either case, the instrument or instruments provide as an output to controller 39 signals representing flow rate (e.g., gallons per minute) and density (e.g., pounds per gallon) of the aqueous effluent and suspended solids passing the instrument (the primary variables at this stage). The instrument or instruments may provide other signal pairs, for example representing mass flow rate (e.g., pounds per minute) and flow rate or velocity (e.g., feet per second), so long as the primary variables can be derived from these other signal pairs at controller 39. These signals may be either analog or digital outputs, depending upon the instrument or instruments utilized.

The drilling fluid then passes out to mixing (or flocculating) unit 25 (after injection of liquid polymer into the flow) and to centrifuge 27 for separation of the solids/floc from the centrate. A portion of the flow from mixing unit 25 is directed through conduit loop 63 (by a variable speed processor controlled progressive cavity pump through a slip stream junction and suction valve, for example) to an optical floc evaluation cell 65.

Cell 65 provides an image of floc formation to its onboard processing unit 67 for evaluation. The onboard processing unit includes its own user interface and will provide an output (a digital signal/value) indicative of the quality of floc formation at that stage in the flow to controller 39. Such an instrument may be for example, the FLOCTRONIC flocsonde by Passavant-Werke AG. After passage through cell 65, the portion of the flow returns via a slip stream junction and discharge valve to the main flow.

Liquid polymer from polymer processing and storage unit 23 is selectively injected (under control of controller 39 as hereinafter described) into the main effluence flow by injection pump 69 operated by controllable variable speed motor 71. Injection pump output flow rate is measured by flow meter 73 (for example, a FISHER-ROSEMOUNT magnetic flow meter by Rosemount Incorporated with a 4 to 20 mA output signal indicative of a value in gallons per minute), meter 73 providing a measured output rate signal to controller 39 (either digital or analog signal depending upon the type of instrument selected).

Acid for pH conditioning of the effluence is selectively injected from acid storage unit 33 into the main effluence flow by injection pump 75 operated by controllable variable speed motor 77 (responsive to control signals from controller 39). Controlled injection rates of acid are computed at controller 39 with reference to pH value input signals (for example, 4 to 20 mA analog signals) received from incoming and outgoing pH probes 79 and 81, respectively (for example, a Model 40 wet tap-type pH probe by Innovative Sensors, Inc. may be utilized). Coagulant, likewise, is selectively injectable by injection pump 83 operated by controllable variable speed motor 85 in response to a selected user value (injection rate) input at user input unit 41.

Figure 3:
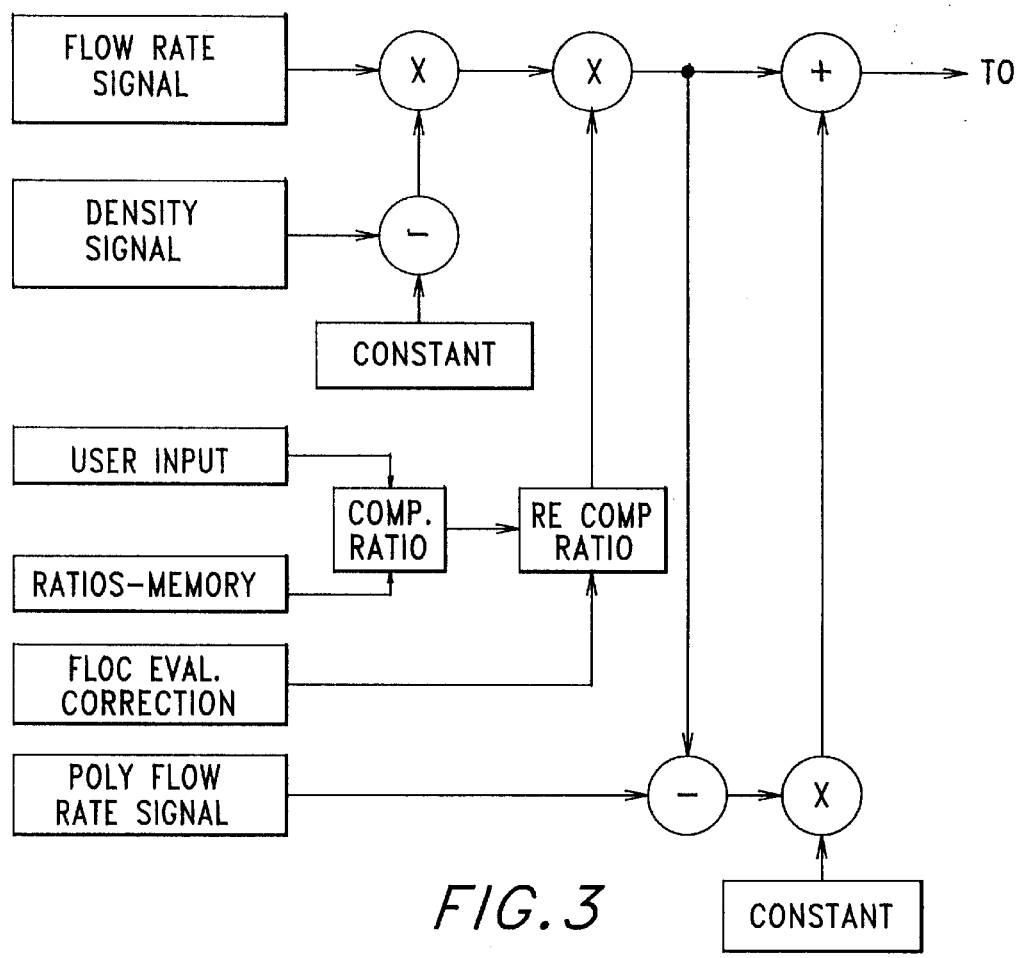
FIG. 3 is a flow diagram illustrating automated control operations of this invention performed for effluent conditioning and treatment with a polymer material.

Control of the various process control, conditioning and treatment stages will be described with reference to FIGS. 3, 4A and B, and 5A and B. In FIG. 3, describing process control at controller 39 of introduction of liquid polymer flocculant into the effluence utilizing apparatus 11 of this invention, controller 39 inputs the signals from the measurement of mass flow rate at meter 57, a numerical value from user input interface unit 41, and injection pump 69 flow rate measured at meter 73. Controller 39 converts the input signals to its internal representation of numbers.

The density of water constant (8.33 pounds per gallon) is subtracted from the measured density of the effluence. The remainder value represents the mass of solids suspended in the flow. The remainder density (e.g., pounds per gallon) is then multiplied by the flow rate (e.g., gallons per minute) to get the likely mass flow rate (e.g., pounds per minute) of the solids in the effluence.

The inputs from user input unit 41 (operator adjustment to desired ratio of liquid polymer flocculant to suspended solids in the effluence, allowing for use of polymers from various manufacturers or the like) and polymer to solids ratios suggested by various polymer manufacturers and stored and retrieved from memory unit 43 are utilized to calculate an ideal injection rate of liquid polymer flocculant into the flow. This ratio (for example, expressed as a 4 to 20 mA signal) is subject to recomputation based upon the floc evaluation input from floc evaluation unit 65/67 (expressed as a 4 to 20 mA correction signal, for example). The likely mass flow rate is then multiplied by the output ratio to provide an injection rate control signal to controllable motor 71 operating polymer injection pump 69 (for example, a 4 to 20 milliamp analog control signal).

As may be appreciated, this operation (as do those hereinafter described) takes place on the fly and is subject to almost constant recalculation and process adjustment. Since the output of pump 69 may not be in precise conformance with the control signal, the actual injection rate (the flow rate at the point of injection) of polymer flocculant into the main effluence flow as sensed at meter 73 is input to controller 39. The actual injection rate is subtracted from the calculated injection rate control signal to achieve a numerical representation of the injection rate error. This error is multiplied by a gain constant (to prevent overcorrection) and then added to the calculated injection rate control signal for self adjustment of the injection rate output control signal.

Figure 4A:
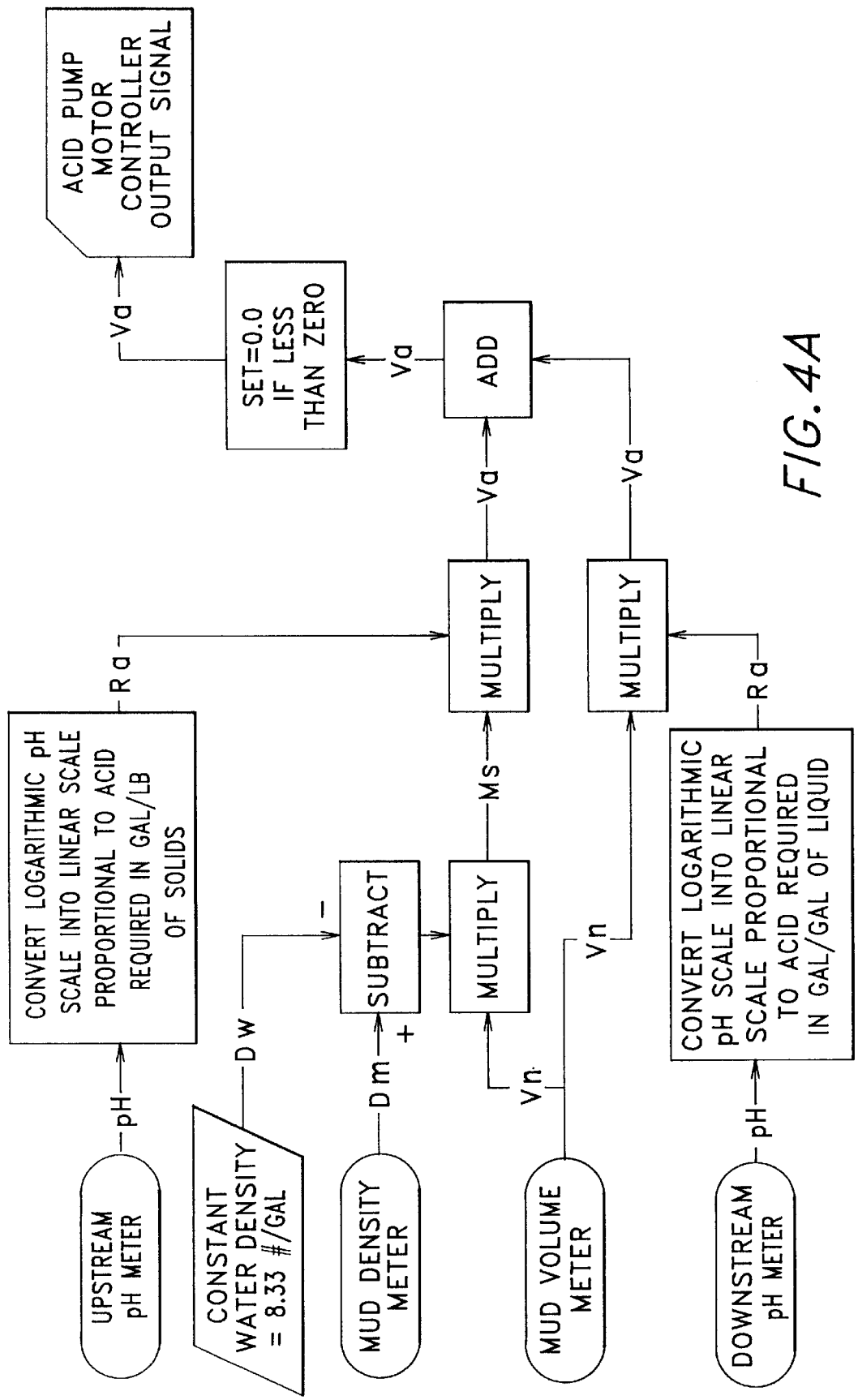
FIGS. 4A and 4B are flow diagrams illustrating automated pH control operations of this invention performed for effluent conditioning and treatment.
Figure 4B:
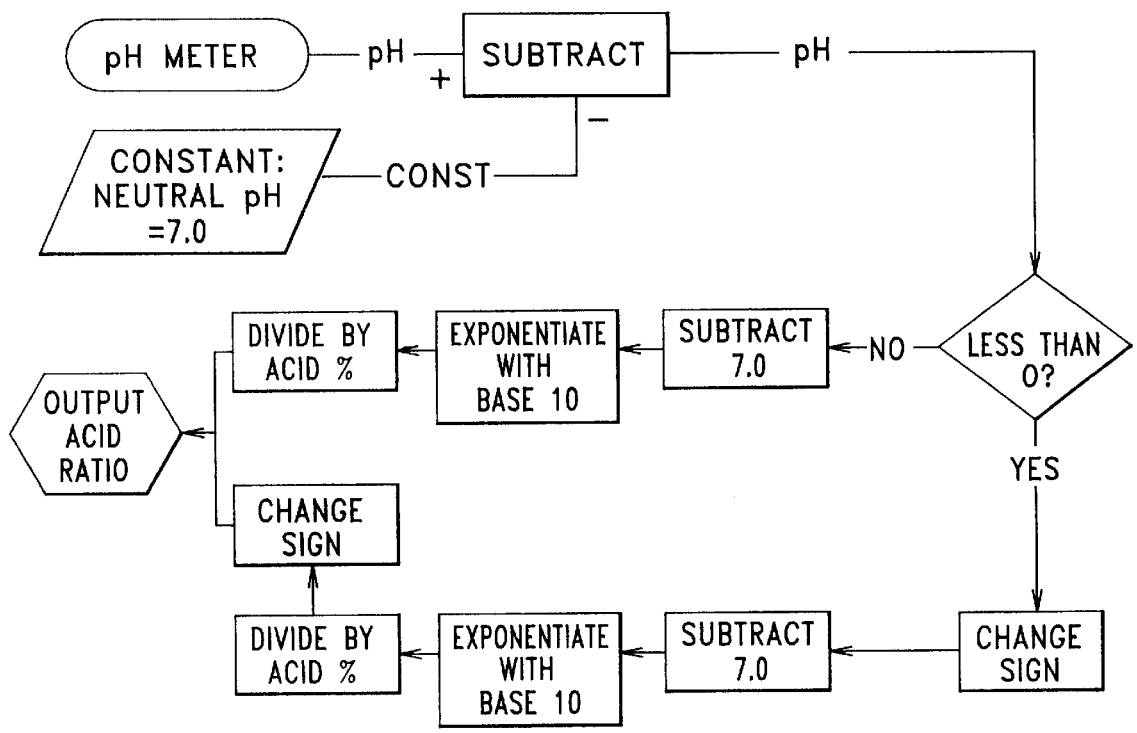

In FIGS. 4A and 4B, pH level control processes are described (a closed loop, proportional control, system). Typically, for example, it is desired to bring drilling fluid into the range of pH=6 to pH=8. Incoming pH value from probe 79 is input to controller 39 which, responsive thereto, calculates a required acid injection amount based on desired variable pH setting (from input unit 41 and/or values stored in memory 43) and the then present effluence flow volume signal from meter 57. An analog injection rate output signal (from 4 to 20 mA) is provided for controllable motor 77 operation of acid injection pump 75. The input pH value from probe 81 is representative of the chemical residual in the effluence stream after the chemical reaction (i.e., after acid injection) is completed and is utilized for output signal adjustment. The acid feed rate is proportional to the deviation from the ideal injection rate, so the farther from the ideal setpoint, the more acid is added. The closer to the setpoint, the less acid is added.

A measured value output, proportional to the probes measurement, is utilized for recording. A control output increases or decreases according to the control action to adjust pump 75 output to maintain the desired setpoint. Since simple proportional control results in over-injection, a proportional-integral-derivative controller (PID) is employed, which considers the deviation from the setpoint and also takes into account both the rate of change and the time required to bring the process into control in adjusting the pump output.

Controller 39 first calculates the mass flow rate of suspended solids in the effluence as previously discussed. The upstream reading from probe 79 is converted to a ratio of acid to effluence. The ideal flow rate of acid is then calculated by multiplying the ratio times the mass flow rate of suspended solids. To this is added (or subtracted) the result of similar calculation performed using input of downstream probe 81 multiplied by the volume (flow rate) input from meter 57.

The conversion of pH signal to the ratio of acid required (FIG. 4B) is accomplished by subtracting the neutral pH=7 from the measured pH. The resulting number is used to determine if the effluence sensed is basic (pH>7) and needs more acid injected, or acidic (ph<7) and needs less acid injected. The amount of acid to be added (or subtracted) is calculated by further subtracting 7, exponentiating the result to the base 10 (this will result in a number or ratio between 0 and 1), and then correcting the ratio by dividing by the acid percentage.

For example, if pH is measured at 14, corresponding to 1 molar sodium hydroxide, after subtracting 7 twice a value of 0 is obtained. Ten to the zero power is 1. Thus the ratio is one gallon of pure, or 1 molar, hydrochloric acid to one-gallon of sodium hydroxide. If 36% hydrochloric acid is being used, 100/36, or about 3 gallons, of 36% hydrochloric acid would be needed to neutralize one gallon of pure sodium hydroxide. Of course, in a more realistic scenario, if a pH of only 10 is measured, the ratio for 36% acid would drop to about 3 gallons of acid to every 10,000 gallons of effluence.

Figure 5A:
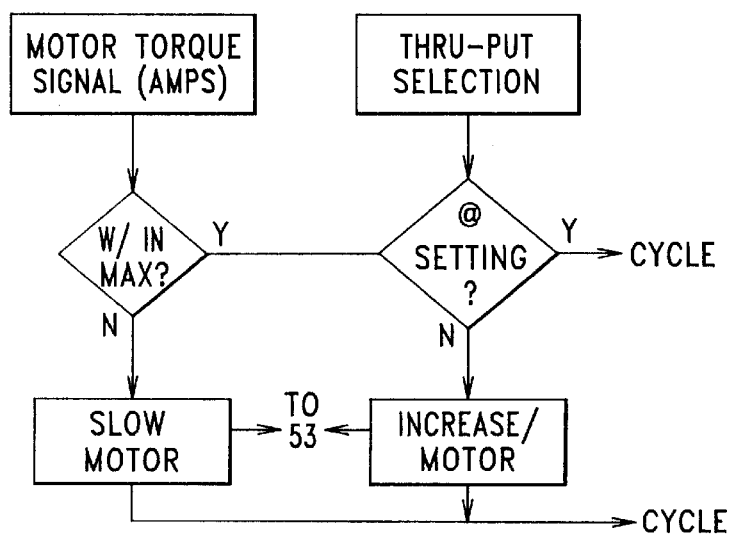
FIGS. 5A and 5B are flow diagrams illustrating automated conditioning rate and effluent weight control functions of this invention.
Figure 5B:
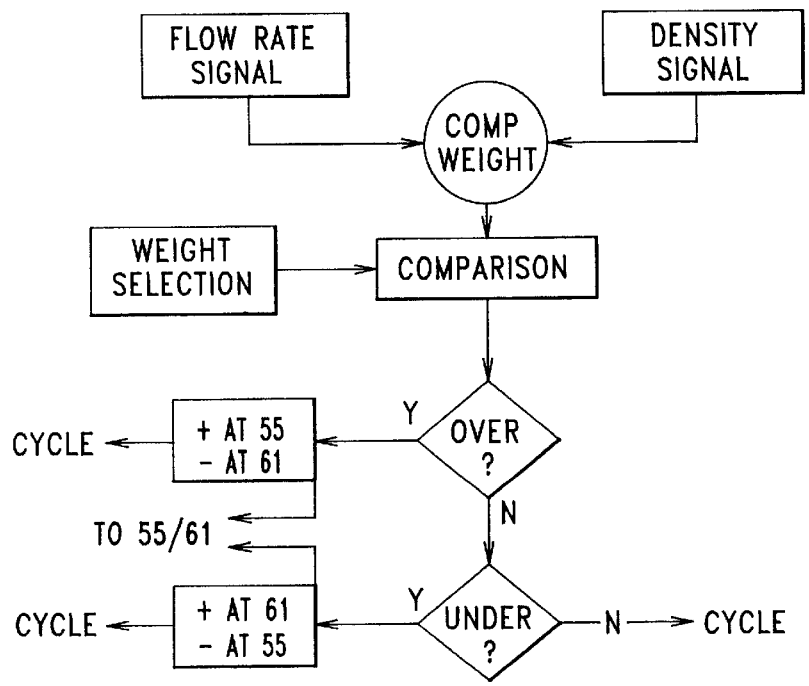

Turning to FIGS. 5A and 5B, a signal indicative of motor torque from motor 29 (in amps) is input to controller 39. In this way, the controller can be apprised of the ability of centrifuge 27 to keep up with the flow through apparatus 11. If the torque is exceeding the maximum safe work rate for the centrifuge, a control signal to motor 53 for proportionally slowing system feed pump 51 is issued. If the torque is within its maximum safe work rate, the system throughput as measured at meter 57 is compared with the desired processing rate (as input by a user at interface unit 41), and, if less, feed pump 51 is proportionally sped up.

Weight of drilling fluid in tank system 17 is controlled by computing the weight of the effluence from the signals input from meter 57 (FIG. 5B). The selected weight (from user input unit 41) is compared. If the weight measured is greater than desired, motor controlled valve 55 is proportionally opened and valve 61 proportionally closed, so that more drilling fluid is processed (and thus solids removed). If the weight measured is less than desired, a reverse operation of the valves is signalled from that just described, so that more of the effluence is returned to the tank system without solids removal. These comparisons and adjustments are continued until the desired weight is achieved.

The apparatus of this invention is provided with means of off-site communication (45) for both data acquisition and process control. Records of all activity of the apparatus over time may be kept and retrieved periodically from memory or recording units 43.

As may be appreciated from the foregoing description, automated yet flexible process control and effluence conditioning and treatment is provided by this invention, with the invention being particularly well adapted to closed loop systems as might be utilized in drilling operations, for example.

What is claimed is:

1. A method for liquid polymer conditioning of an aqueous effluence having varying amounts of suspended solids therein to prepare the effluence for treatment to remove the solids, said method comprising the steps of:
   conducting a flow of the aqueous effluence;
   monitoring the conducted flow and indicating mass flow rate of the conducted flow of the aqueous effluence;
   determining likely mass flow rate of the suspended solids in the conducted flow from the indicated mass flow rate of the conducted flow of the aqueous effluence;
   generating a control signal indicative of a desired rate of liquid polymer injection into the conducted flow based at least in part on the determined likely mass flow rate of the suspended solids; and
   utilizing the generated control signal to drive a mechanism for injecting liquid polymer into the conducted flow at the desired injection rate.

2. The method of claim 1 further comprising the steps of continuing to monitor the conducted flow and indicate the mass flow rate, and continually readjusting the control signal generated in view thereof.

3. The method of claim 1 further comprising the steps of monitoring the pH of the conducted flow of the aqueous effluence, indicating pH of the monitored aqueous effluence, generating a signal indicative of a desired rate of acid injection into the conducted flow based on said indicated pH, and utilizing said generated signal indicative of a desired rate of acid injection for injecting acid into the conducted flow at the desired acid injection rate.

4. The method of claim 3 wherein the steps of monitoring and indicating pH include monitoring pH at locations upstream and downstream of a point of acid injection and indicating pH at both said locations.

5. The method of claim 1 further comprising monitoring injection rate of liquid polymer from said mechanism, indicating said injection rate, and utilizing said indication of said injection rate to adjust said control signal.

6. The method of claim 1 further comprising inputting numerical values indicative of preferred treatment ratios of various types of liquid polymer to suspended solids in the aqueous effluence, and utilizing a selected one of said values when generating said control signal.

7. The method of claim 1 further comprising monitoring and controlling volume of said conducted flow.

8. The method of claim 1 further comprising providing a closed loop treatment system and utilizing said determined likely mass flow rate of suspended solids to generate a control signal to valving units for controlling volume of said conducted flow subject to liquid polymer injection to thereby control weight of said conducted flow.

9. The method of claim 1 further comprising the step of generating a control signal indicative of a desired rate of coagulant injection into the conducted flow and utilizing said coagulant injection rate control signal to drive a coagulant injector.

10. A method for liquid polymer conditioning of an aqueous effluence having varying amounts of suspended solids therein to prepare the effluence for treatment to remove the solids, said method comprising the steps of:
    storing numerical values indicative of preferred treatment ratios of various types of liquid polymer to suspended solids in aqueous effluence;
    conducting a flow of the aqueous effluence;
    monitoring the conducted flow and indicating mass flow rate of the conducted flow of the aqueous effluence;
    determining, based on the indicated mass flow rate of the conducted flow of the aqueous effluence, mass flow rate of the suspended solids in the conducted flow;
    generating a control signal indicative of a desired rate of liquid polymer injection into the conducted flow based at least in part on likely mass flow rate of suspended solids in the conducted flow and a selected one of said stored values;
    continuing to monitor the conducted flow, indicate the mass flow rate of the conducted flow, and likely mass flow rate of suspended solids in the conducted flow to continually adjust the control signal; and
    utilizing the generated control signal to drive a mechanism for injecting liquid polymer into the conducted flow at the desired injection rate.

11. The method of claim 10 further comprising the steps of storing data indicative of ongoing conditioning of the aqueous effluence, and making stored data available for on-site or off-site acquisition by an operator.

12. The method of claim 10 further comprising the step of evaluating floc formation quality downstream from said injecting mechanism and utilizing the evaluation of floc formation quality to further adjust the control signal.

13. The method of claim 10 wherein the steps of monitoring conducted flow are achieved by means of a Coriolus meter.

* * * * *